United States Patent [19]
Fernandes

[11] 4,157,368
[45] Jun. 5, 1979

[54] VORTEX COOLING TOWER

[75] Inventor: John H. Fernandes, Windsor, Conn.

[73] Assignee: Combustion Engineering, Inc., Windsor, Conn.

[21] Appl. No.: 863,755

[22] Filed: Dec. 23, 1977

[51] Int. Cl.² .............................................. B01F 3/04
[52] U.S. Cl. .............................. 261/155; 165/DIG. 1; 261/79 A; 261/109; 261/DIG. 11; 261/DIG. 77
[58] Field of Search ............... 261/25, 79 A, 109, 111, 261/DIG. 11, DIG. 77, 127, 152, 155; 55/459 R, 459 A, 459 B, 459 C, 459 D, 460; 165/DIG. 1

[56] References Cited

U.S. PATENT DOCUMENTS

| | | | |
|---|---|---|---|
| 1,582,550 | 4/1926 | Seymour | 261/79 A |
| 1,929,410 | 10/1933 | Coey | 261/79 A X |
| 2,157,070 | 5/1939 | Coey | 261/DIG. 11 |
| 3,322,409 | 5/1967 | Reed | 261/DIG. 11 |
| 3,358,413 | 12/1967 | Kalika | 261/79 A X |
| 3,385,197 | 5/1968 | Greber | 261/109 X |
| 3,411,758 | 11/1968 | Edmondson | 261/109 X |
| 3,590,558 | 7/1971 | Fernandes | 55/460 X |
| 3,641,743 | 2/1972 | Hoffmann et al. | 261/79 A X |
| 4,036,916 | 7/1977 | Agsten | 261/109 |

FOREIGN PATENT DOCUMENTS

| | | | |
|---|---|---|---|
| 531366 | 8/1931 | Fed. Rep. of Germany | 261/DIG. 11 |
| 773397 | 11/1934 | France | 261/79 A |
| 841089 | 7/1960 | United Kingdom | 261/DIG. 11 |

OTHER PUBLICATIONS

Yen, J. T., "Tornado-Type Wind Energy System: Basic Consideration", ASME Meeting, New York, N. Y., Dec. 5, 1976.

*Primary Examiner*—Richard L. Chiesa
*Attorney, Agent, or Firm*—Edward L. Kochey, Jr.

[57] ABSTRACT

An air-cooled tower for cooling of fluid wherein a vortex is established within a vertically standing cylinder.

Air entering through the upper portion of the cylinder is directed tangentially and downwardly, establishing a downwardly flowing vortex which is reversed at the bottom forming a smaller diameter intense upwardly flowing vortex. Additional air is induced through the center of the cylinder at the bottom. Heat exchange between the fluid to be cooled and the air is through indirect heat exchange surface or direct injection of the fluid. Evaporative cooling is accelerated due to the turbulent conditions, and the centrifugal action reduces the water carryover in the airstream exiting from the top of the cylinder. A turbine-fan combination centrally located at the bottom of the cylinder permits supplementing the airflow under low-wind conditions and extracting energy from the induced airflow under high wind conditions.

40 Claims, 4 Drawing Figures

VORTEX COOLING TOWER

BACKGROUND OF THE INVENTION

This invention relates to cooling of fluid and in particular to wet or dry air-cooled cooling towers.

Various industrial processes such as steam electric power plants have substantial need for cooling of a fluid at low temperature. When available, and if not ecologically detrimental, river water is used for cooling. Under other circumstances air-cooled cooling towers are used. The towers may be dry or wet. In a dry tower the fluid is cooled by indirect heat exchange with the air flowing over heat exchange surface. In a wet tower there is direct heat exchange between water and the air and a portion of the cooling is accomplished evaporatively.

Each of these towers furthermore may be of the mechanical or natural draft type. In a mechanical draft tower either a forced or induced draft fan produces the air flow through the tower. In a natural draft tower a very tall (in the order of 350 feet or more) tower is used with heat exchange taking place near the bottom. The tower is frequently of the hyperbolic shape and air flow is caused by the difference in density between the ambient air and the warm or saturated air within the tower.

A mechanical draft tower is less expensive to construct because of its limited size. Substantial power consumption is required however during the operation of the tower. On the other hand, a natural draft tower has a power consumption limited to that to circulate the fluid, and to pump the water in the event of a wet coolng tower. The initial cost of a natural draft tower is, however, greater than that of the mechanical draft tower.

Each of these towers suffers in its performance in the presence of wind. Normal wet cooling towers experience a phenomenon called blowout, where the air entering forcefully on one side blows straight through the lower tower horizontally taking some water with it. In a natural draft tower the tower itself blocks the wind flow thereby producing an extremely low pressure on the downwind side, reducing the air circulation. This causes a reduction in the heat transfer or thermal performance of the tower in the presence of wind.

The relatively negative pressure on the downwind side of a tower tends to create recirculation of the heated or saturated air leaving the tower into this low pressure area from which it recirculates back into the tower. This further decreases its performance.

SUMMARY OF THE INVENTION

It is an object of the invention to provide a high cooling capacity and a relatively small cooling tower. It is a further object to avoid or minimize power consumption. It is a further object to reduce water loss in a wet cooling tower. It is a further object to use that wind energy beyond that required for cooling to directly generate power.

An upstanding cylindrical spin chamber has openings in the upper portion which direct air flowing into the tower in a direction to form a downwardly flowing vortex in the outer portion of the spin chamber. A smooth annular head located at the bottom of the chamber has an upwardly extending central portion. This reverses the vortex to an upward flowing vortex within the outer vortex and the upwardly extending portion stabilizes the vortex. This produces an extremely low pressure at the center of the reversing hood which has an opening at that location for the purpose of inducing air flow therethrough. At the upper end of the chamber there is an annular arcuate flow regeneration means which regenerates a portion of the flow vortex and also operates to act as a centrifical separator to minimize the moisture carried out with the air through an opening in the top of the spin chamber.

Rotary blades are located in the induced flow path which operate to drive a generator or a pump during periods of excess wind and which may be used as a fan to stimulate air flow in periods of low wind.

With a dry cooling tower the heat exchange surface is located in the air flow path and some water may flow through the vanes to use that surface for heat exchange surface.

With a wet cooling tower water is sprayed into the air stream either before or inside the chamber for intimate contact with the radidly swirling air. Water which is thrown to the outside of the vortex travels down the surface and is stripped through a slot in the lower reversing hood. This water may then be passed through the incoming air either by free fall or by dropping through packing.

The wind actually improves rather than decreases the performance of the cooling tower. The low pressure downstream of the tower is reduced since the tower takes in a portion of the air flowing. Furthermore, to the extent that the wind does tend to produce the detrimental effects on cooling towers there is always an increase in the pumping energy due to the wind which is in proportion to the detrimental effect of the wind. Carryover of the unevaporated water is reduced due to the centrifical action in the tower and the stripping action of the regenerating surface of the regenerating head.

A high capacity reduced sized tower may be obtained and power consumption may be avoided or minimized depending on the option selected by the designer. The options would deal with the problem of operating the tower at wind velocities other than that for which it was designed. At one extreme the tower could be designed as a very tall tower operating on natural draft with no wind. Any wind would induce flow through the tower and the excess energy available would be used by the turbine to generate power.

Alternately, the designer could elect to size the tower for the design cooling at a selected wind velocity. At lower wind velocities the flow could be stimulated by spraying of water, increased water spraying capacity could be used, or the turbine generator could be operated as a motor fan to induce more flow. Alternately the air cooled tower could be backed up by river water cooling in areas where there is ecological objection to long-term heating of the river water. The river water would only be used during those periods in which the wind energy is insufficient to meet the generating level of the plant.

DESCRIPTION OF THE PREFERRED EMBODIMENTS

Figure 1:
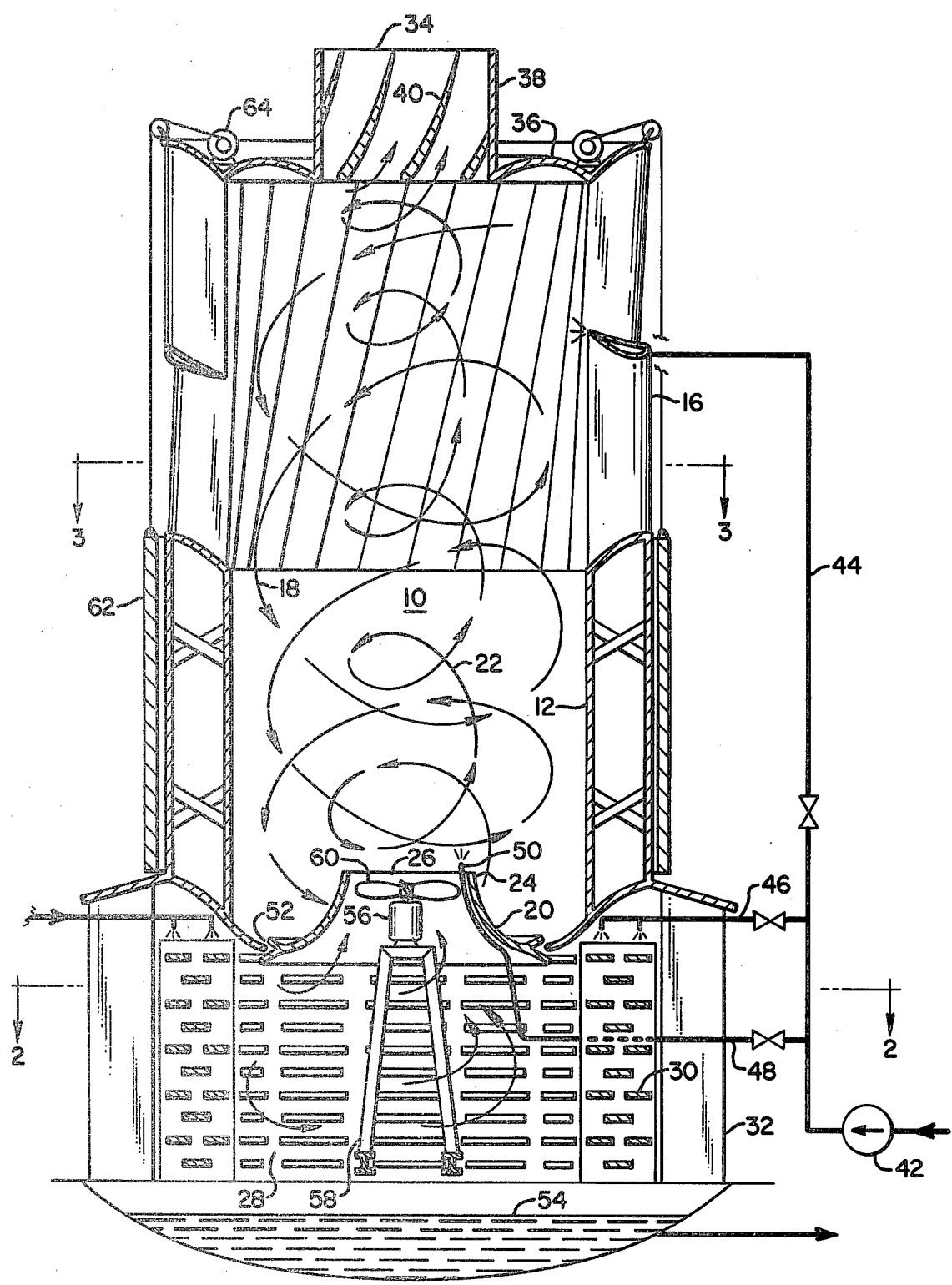
FIG. 1 is a sectional side elevation of a wet cooling tower.
Figure 2:
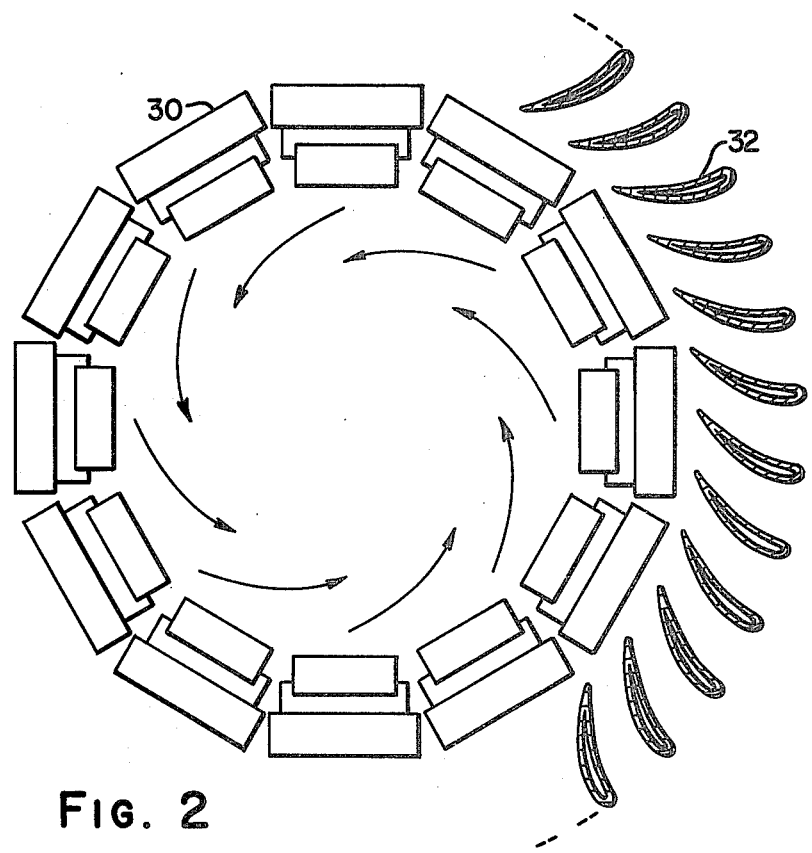
FIG. 2 is a sectional plan view through the air induction section below the spin chamber.
Figure 3:
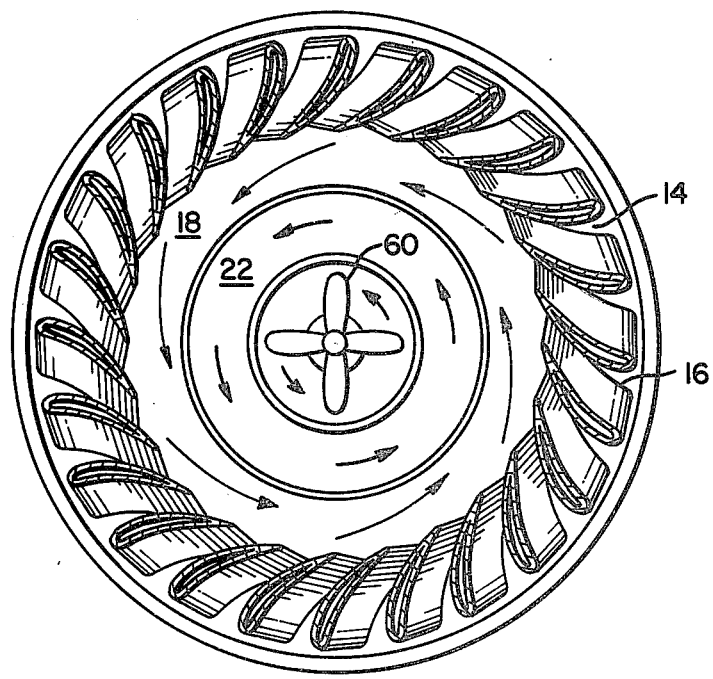
FIG. 3 is a sectional plan view through the top of the spin chamber and FIG. 4 is a sectional side elevation of a dry cooling tower.

A flow vortex is established in the cooling tower by efficiently collecting and concentrating the wind from the great volume of air immediately around the total tower. This provides motive force for additional induced air flow through the tower, increases air to water heat interchange and provides an inherent separation of water droplets to avoid water carryover. A spin chamber 10 is formed within an upstanding vertical cylinder 12. The upper portion of the cylinder has air inlet openings 14 therethrough formed by air foil vanes 16. These are essentially three-dimensional nozzles and they deflect the air downwardly and in a tangential direction creating an outer peripheral vortex 18. The swirling vortex moves axially towards the bottom of the spin chamber.

An annular arcuately shaped reversing head is located at the bottom end of the spin chamber. The downwardly flowing outer vortex 18 is reversed by this head to form an intense inner vortex 22 which is flowing upwardly, but rotating in the same direction. An upwardly extending cylinder 24 is located on the inner periphery of the reversing head. This surrounds the induced air opening 26 and functions to stabilize the vortex formed within the spin chamber.

The vortex action creates an extremely low pressure at the induced air inlet 26 in a manner similar to tornados and hurricanes where an extremely low atmospheric pressure is found in the core of the vortex. The low pressure in this tower is used to induce a flow of air into the spin chamber through a lower secondary air induction chamber 28. Air in flowing through this chamber passes over the packing 30 after passing through the vanes 32 which produce a spinning motion in the induced air flow. This increases the intensity of the vortex in the induction chamber. The tangential introduction of air also deters a blowout caused by air blowing through the induction chamber. As an alternate to the use of vanes 32 for producing a tangential introduction, the packing itself may be designed to so direct the air flow.

The induced air flow joins the inner vortex and passes upwardly through the spin chamber toward outlet 34 at the top of the spin chamber. This outlet preferably has a diameter greater than the inlet 26 since the wind passing through openings 14 as well as the induced air flow must pass through the outlet 34. An arcuate annular regeneration head 36 is located at the upper end of the spin chamber providing regeneration surface. This intercepts a portion of the upwardly flowing internal vortex and returns it to the outer downwardly flowing vortex to increase the intensity thereof. An upwardly extending cylinder 38 is located at the outlet containing straightening vanes 40 so that the air flow leaves with only an upward component to increase the dispersal of the air which has passed through the tower, thereby minimizing the chance of its being recirculated back into the tower.

The water to be cooled enters through pump 42 and may be introduced into the cooling tower at a plurality of locations. Water flowing through lines 44 passes through vanes 16 and is sprayed from the inner edge thereof in a tangential direction. Spraying in this direction helps to induce the rotation of the air during periods of light wind.

Water passing through line 46 is cascaded over packing 30 through which the induced air flow must pass. Water flowing through line 48 is introduced into the spin chamber immediately adjacent the induced air opening 26 through nozzle 50. The sprays are preferably directed in a tangential direction with a component toward the center into the induced air flow stream. The intense air flow within the vortex generates substantial forces on the water droplets thereby breaking them into small particles and increasing the evaporative effectiveness.

As the flow passes upwardly through the spin chamber, any unevaporated water droplets tend to be thrown outwardly into the downwardly flowing vortex or are reversed at the reversing head 36. In the vane area the water droplets would tend to move from tip to tip under the influence of the vortex and in the lower portion of the spin chamber a film of water is expected on the wall as well as droplets in suspension. The intense scrubbing action on this wall further evaporates some of the water. The water remaining is stripped out through an annular slot 52 in the reversing head 20. This water may cascade directly through the air flowing in chamber 28 into the cold water pond 54 or it may be conducted over packing 30. This provides additional opportunity for heat exchange between the water and the induced air flow. It should be noted that any carryover from the packing or the cascading water through slot 52 will pass in through the spin chamber and be subjected to not only the scrubbing action but the centrifical separation phenomenon.

A motor generator 56 is located on support 58 and is operatively connected to blades 60. These blades may be variable pitch blades and during periods of high wind the blades are operated as turbine blades and the motor generator 56 is operated as a generator. Alternately, the power taken from the induced air flow could be used to pump the cooling water. During periods of low wind flow where additional air flow may be required through the tower, the rotating blades 60 are operated as fan blades driven by motor 56 to increase the air flow through the air tower. Operation of the fan even in periods of no wind will induce air flow through the upper openings 14 so that the vortical action is retained. The direction of the vortex in all of these situations should be counterclockwise for construction in the northern hemisphere and clockwise for construction in the southern hemisphere to increase the stability of the vortex under marginal conditions.

Should there be a need to reduce the energy consumed by the tower, a surrounding shroud 62 may be raised by winch 64 to block off a portion of the openings 14.

The air inlet openings 14 are located at a height inherently above normal surrounding obstructions. Wind at this elevation having a velocity greater than at ground level is used to produce the motive power for the tower. Local variations in air flow patterns are also minimized at this higher elevation. Therefore, performance of the tower is consistent regardless of wind direction.

The hurricane is a cyclonic storm with a warm core. Air converges towards the center at low elevations, rises and diverges outward at upper levels. The warmth of the central portion depends upon the high water content of the rising air at lower pressures, where latent heat is given up during condensation as is the case in the wet version of the cooling tower. The flow in the main chamber from the higher pressure inlet area to the low pressure sink area, which is created about the center portion of the reversing head, simulates some of nature's most powerful vortex phenomenon, which includes cyclones, typhoons, and tornadoes, as well as hurricanes. These, of course, are among the most destructive atmospheric phenomenons on earth, deriving their deadly efficiency, not only from the thermally created high winds, but also from the extremely low atmospheric pressure, found in the core of the vortex. This low pressure in the core is used in the cooling tower to induce a flow of air from the induction chamber of the tower which augments air introduced by the wind's passage through the vaned section of the tower.

Figure 4:
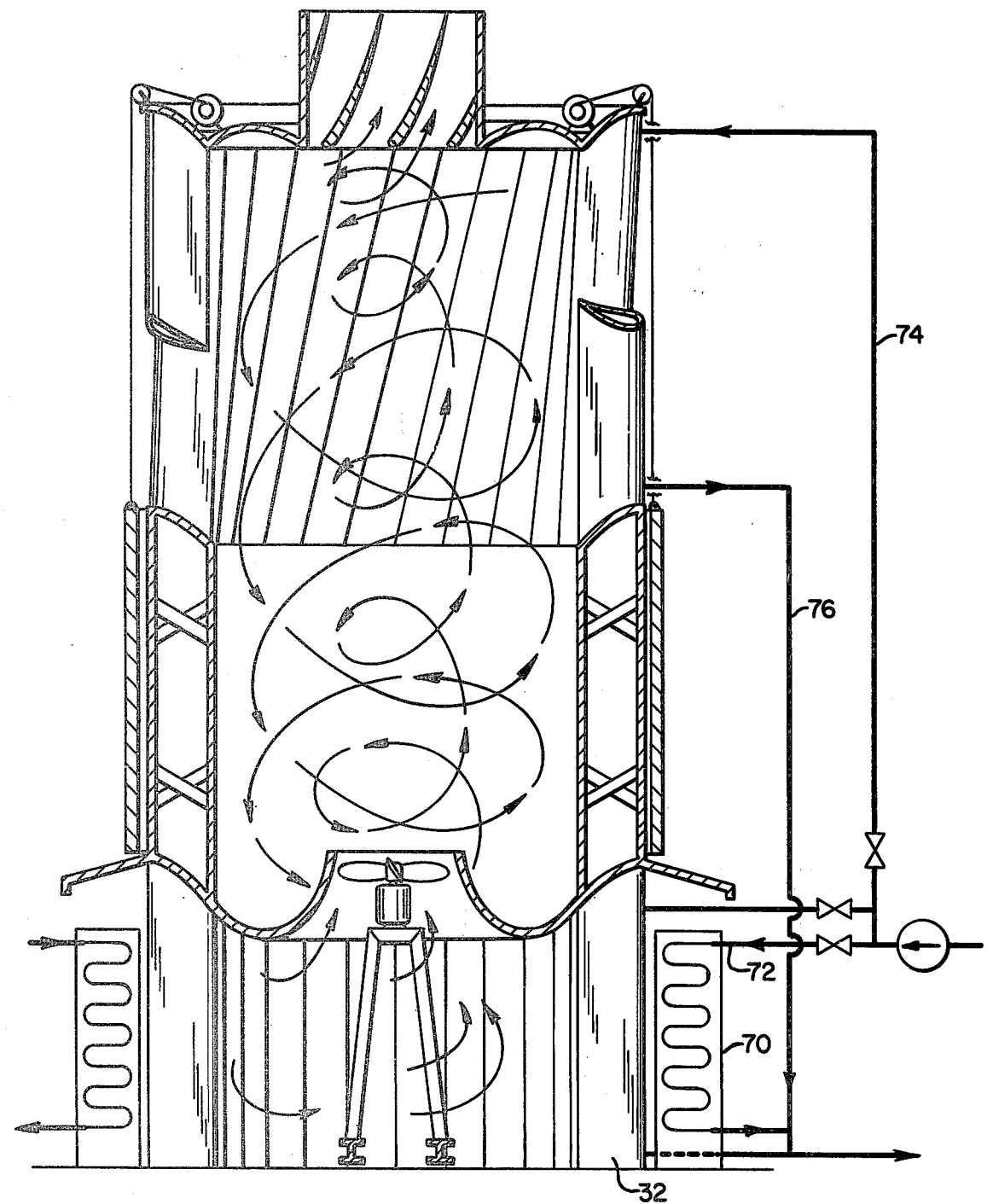

FIG. 4 illustrates a dry cooling tower embodiment of the invention. In this embodiment no water is sprayed into the air flow but indirect heat exchange surface 70 is located in the induced air flow path. Water flowing through line 72 is cooled in the heat exchanger. Additional water may be passed through line 74 from which it passes through hollow vanes 16 and returns through line 76. Additionally water may be passed through hollow vanes 32 for additional cooling through these surfaces. The vanes will be an effective heat transfer surface because of the high velocities of air passing therethrough.

It will be understood that the embodiment shown and described herein is merely illustrative and that changes may be made without departing from the scope of the invention as claimed.

What is claimed is:

1. An air-cooled tower for cooling a fluid comprising: an upstanding cylindrical spin chamber having downwardly tangentially directed openings in the upper portion thereof, said openings having direct communication between said chamber and the surrounding atmosphere, and being sufficiently numerous to pass a large portion of the wind impacting on said chamber, an axially located outlet at the top, and an axially located inlet at the bottom; means for conducting ambient air to said axially located inlet; whereby an induced air flow path is established serially through said means for conducting ambient air, said inlet, and said chamber and an induced flow of air is established therethrough when wind driven air passes thru said tangentially directed openings; and heat exchange means for transferring heat between the fluid to be cooled and air passing through said upstanding chamber.

2. An apparatus as in claim 1, having also an annular arcuate flow reversing means for reversing flow, located within said chamber at the lower end thereof.

3. An apparatus as in claim 2, having also an annular arcuate flow regeneration means for regenerating flow, located within the chamber at the upper end thereof.

4. An apparatus as in claim 3, having a vortex stabilizing means comprising an upwardly extending cylindrical extension at the inner periphery of said annular flow reversing means.

5. An apparatus as in claim 4, wherein the opening in the center of the regenerative means is greater than the opening in the center of the reversal means.

6. An apparatus as in claim 5, having rotary blades located in said induced air flow path.

7. An apparatus as in claim 6, wherein said rotary blades comprise turbine blades; and a power transferring means attached to and driven by said turbine blades.

8. An apparatus as in claim 6, wherein said rotary blades are fan blades; and drive means connected to drive said fan blades.

9. An apparatus as in claim 6, wherein said rotary blades comprise combination turbine and fan blades; and electric means attached to said rotary blades for being driven by said turbine blades and driving said fan blades.

10. An apparatus as in claim 1, wherein said heat exchange means consists only of an indirect heat exchanger located in said induced air flow path.

11. An apparatus as in claim 1, wherein said heat exchange means comprises means for spraying water into air flowing through at least a portion of said induced air flow path.

12. An apparatus as in claim 2, wherein said heat exchange means comprises means for spraying water into air flowing through at least a portion of said induced air flow path; and said annular reversing means has an annular slot therethrough at a location near the bottom thereof.

13. An apparatus as in claim 12, wherein said means for conducting air includes means for passing the air below the slot, whereby water passing through said slot also passes through the air flowing through the induced air flow path.

14. An apparatus as in claim 13, having also packing located in the induced air flow path at an elevation below said slot, and said slot so arranged to pass water flowing therethrough over said packing.

15. An apparatus as in claim 11, wherein said heat exchange means comprises means for spraying water into the induced air flow path, at a location prior to said air entering said axially located inlet.

16. An apparatus as in claim 1, wherein said heat exchange means comprises means for spraying water into the air within said chamber.

17. An apparatus as in claim 16, wherein said means for spraying water is located adjacent said axially located inlet, and is directed into the induced flow air stream.

18. An apparatus as in claim 1, wherein said openings are formed by air foil vanes.

19. An apparatus as in claim 1, wherein said means for conducting ambient air includes tangentially directed vanes located below said chamber.

20. An apparatus as in claim 1, having also straightening vanes located in the axially located outlet at the top.

21. An apparatus as in claim 20, having means for passing fluid to be cooled through at least some vanes.

22. An apparatus as in claim 2, having a vortex stabilizing means comprising an upwardly extending cylindrical extension at the inner periphery of said annular flow reversing means.

23. An apparatus as in claim 2, having rotary blades located in said induced air flow path.

24. An apparatus as in claim 23, wherein said rotary blades comprise combination turbine and fan blades; and electric means attached to said rotary blade for being driven by said turbine blade and driving said fan blade.

25. An apparatus as in claim 3, wherein said heat exchange means consists only of an indirect heat exchanger located in said induced air flow path.

26. An apparatus as in claim 3, wherein said heat exchange means comprises means for spraying water into air flowing through at least a portion of said induced air flow path.

27. An apparatus as in claim 26, wherein said annular reversing means has an annular slot therethrough at a location near the bottom thereof.

28. An apparatus as in claim 3, wherein said heat exchange means comprises means for spraying water into the air within said chamber.

29. An apparatus as in claim 3, wherein said means for spraying water is located adjacent the central opening of said flow reversing means, and directed into the induced flow air stream.

30. An apparatus as in claim 29, having a rotary blade located in said induced flow air path.

31. An apparatus as in claim 30, wherein said rotary blades comprise combination turbine and fan blades; and electric means attached to said rotary blades for being driven by said turbine blades and driving said fan blades.

32. An apparatus as in claim 30, wherein said tangentially directed openings are also downwardly directed openings, and are formed by air foil vanes.

33. An apparatus as in claim 32, wherein said annular reversing means has an annular slot therethrough at a location near the bottom thereof, and said means for conducting air includes means for passing the air below the slot; whereby water passing through said slot also passes through the air flowing through the induced air flow path.

34. An apparatus as in claim 25, wherein said tangentially directed openings are also downwardly directed openings, and are formed by air foil vanes; said means for conducting ambient air including tangentially directed vanes located below said chamber; straightening vanes located in the axially located outlet in the top; and having means for passing fluid to be cooled through at least some of the vanes.

35. An apparatus as in claim 34, having a rotary blade located in the central opening of said annular flow reversing means.

36. An apparatus as in claim 35, wherein the opening in the center of the regenerative means is greater than the opening in the center of the reversal means; a vortex stabilizing means comprising an upwardly extending cylindrical extension at the inner periphery of said annular flow reversing means; said rotary blades comprising a combination of turbine and fan blades; and electric means attached to said rotary blades for being driven by said turbine blades and driving said fan blades.

37. An apparatus as in claim 9, wherein said heat exchange means comprises means for spraying water into the induced air flow path, at a location prior to said air entering said axially located inlet; said tangentially directed openings being also downwardly directed openings formed by air foil vanes; said means for conducting ambient air including tangentially directed vanes located below said chamber; straightening vanes located in the axially located outlet at the top; and means for passing fluid to be cooled through at least some of the vanes.

38. An apparatus as in claim 9, wherein said heat exchange means comprises means for spraying water into the air within said chamber at a location adjacent said axially located inlet, and directed into the induced flow air stream; said tangentially directed openings being also downwardly directed openings and formed by air foil vanes; said means for conducting ambient air including tangentially directed vanes located below said chamber; straightening vanes located in the axially located outlet at the top; means for passing fluid to be cooled through at least some of the vanes; said annular reversing means having an annular slot therethrough at a location near the bottom thereof; said means for conducting air including means for passing the air below the slot, whereby water passing through said slot also passes through the air flowing through the induced air flow path; and packing located in the induced air flow path at an elevation below said slot, and said slot so arranged to pass water flowing therethrough over said packing.

39. An apparatus as in claim 9, wherein said heat exchange means comprises means for spraying water into the air within said chamber; said annular reversing means having an annular slot therethrough at a location near the bottom thereof: and said means for conducting air including means for passing the air below the slot, whereby water passing through said slot also passes through the air flowing through the induced air flow path.

40. A fluid cooling tower with air flow induced therethrough by wind energy comprising: a cylinder defining a spin chamber; a coaxial discharge stack at one end of said chamber; said spin chamber having downwardly tangentially directed openings directing wind which impacts on said cylinder through the walls thereof in a downward direction tangentially within said chamber and for forming an outer vortex moving axially from the discharge stack end; reversing means at the other end of the chamber for reversing the axial direction of the outer vortex for forming an inner vortex moving axially toward the discharge stack; a coaxial inlet tube centrally located in said reversing means; means for conducting ambient air to said inlet tube, whereby an air flow path is formed through said means for conducting air, said inlet tube, and said spin chamber; and heat exchange means located in the air flow path for transferring heat between the fluid to be cooled and air.

* * * * *